UNITED STATES PATENT OFFICE.

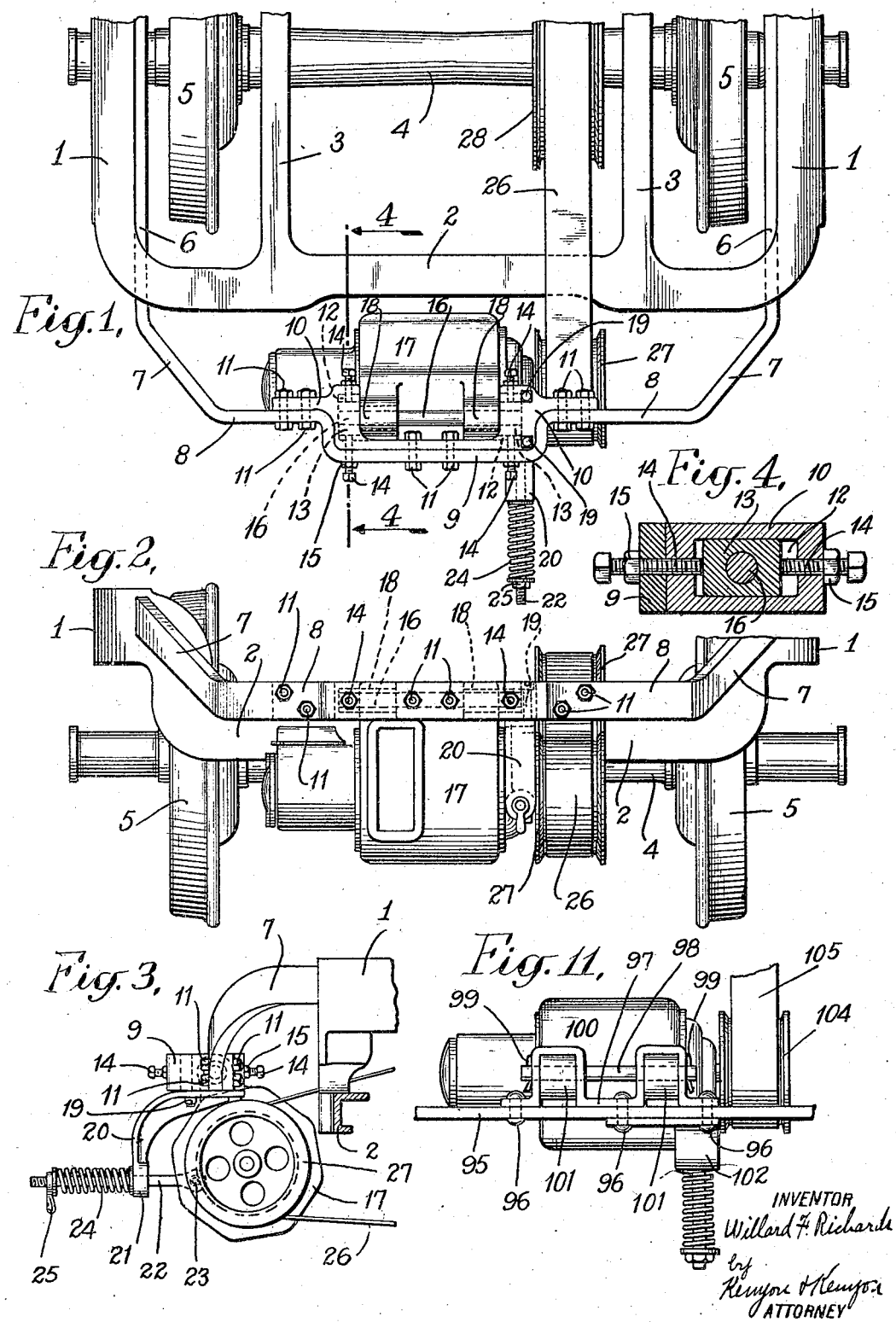

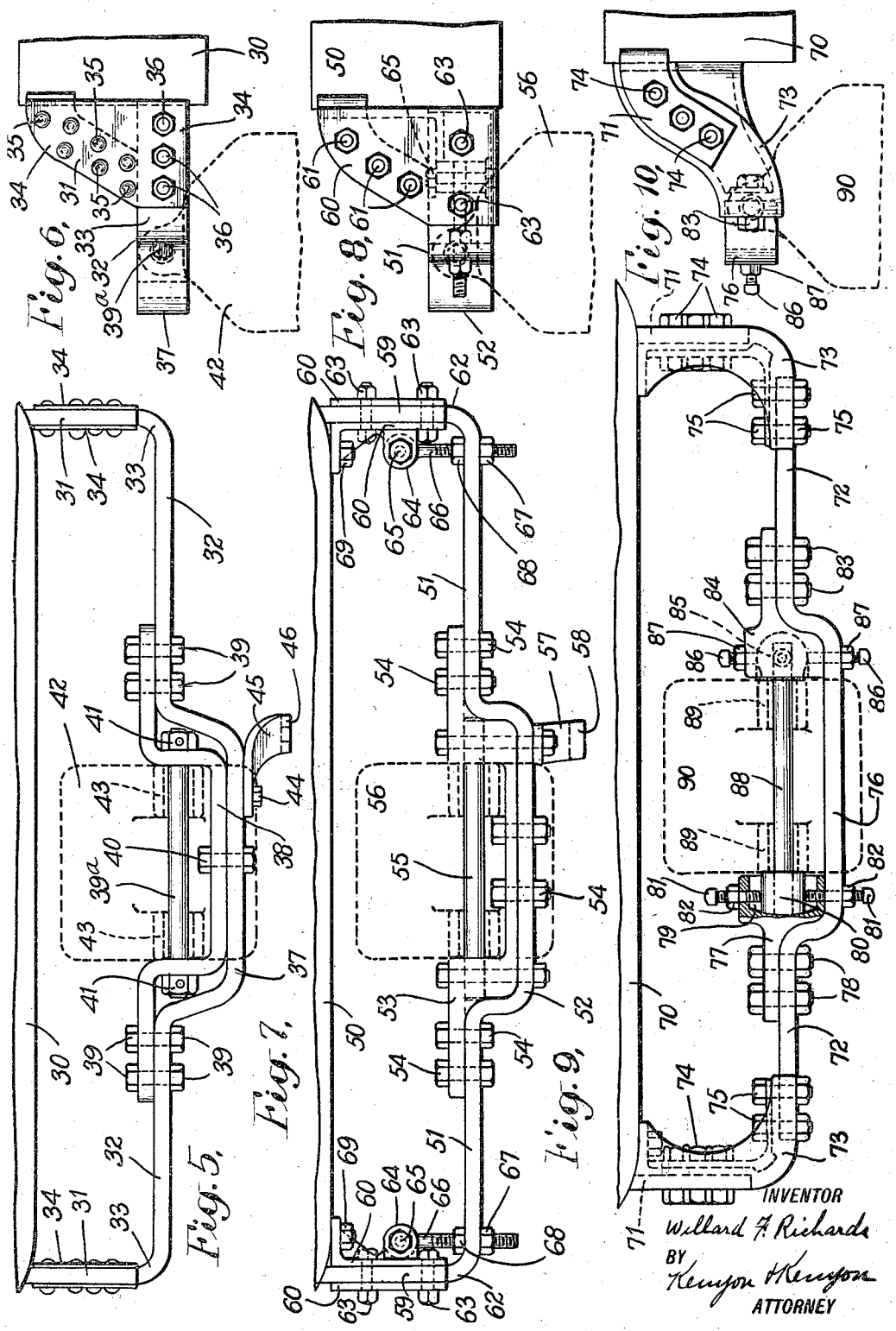

WILLARD F. RICHARDS, OF BUFFALO, NEW YORK, ASSIGNOR TO GOULD COUPLER COMPANY, A CORPORATION OF NEW YORK.

DYNAMO SUSPENSION.

1,242,597. Specification of Letters Patent. Patented Oct. 9, 1917.

Application filed June 28, 1915. Serial No. 36,668.

*To all whom it may concern:*

Be it known that I, WILLARD F. RICHARDS, a citizen of the United States, and a resident of Buffalo, county of Erie, State of New York, have invented certain new and useful Improvements in Dynamo Suspensions, of which the following is a specification.

My invention relates to improvements in dynamo suspensions, and more particularly to suspensions for dynamos on car trucks, in which the dynamo is driven from an axle of the truck.

The main object of my invention is to provide a simple and efficient arrangement, which is easily constructed and assembled and in which the dynamo is easily accessible for inspection and repairs and from which it may be easily removed.

Further objects, features and advantages will more clearly appear from the detailed description given below taken in connection with the accompanying drawings, which form a part of this specification.

In the drawings Figure 1 is a plan view of a portion of a car truck with a dynamo suspension carried thereby, embodying my improvements in one form. Fig. 2 is an end view of the same. Fig. 3 is a partial side view of the same. Fig. 4 is a section through the supporting parts taken on the line 4—4 of Fig. 1. Fig. 5 is a partial plan view illustrating a modification. Fig. 6 is an end view of parts shown in Fig. 5. Fig. 7 is a partial plan view illustrating a further modification. Fig. 8 is an end view of parts shown in Fig. 7. Fig. 9 is a plan view, partly in section, of parts of another modification. Fig. 10 is an end view of parts shown in Fig. 9. Fig. 11 is a partial plan view of parts of a further modification.

Referring to Figs. 1 to 4, there is represented a car truck having side sills 1, a depressed end sill 2 and safety sills 3. One of the truck axles is shown at 4, with the car wheels 5. Carried by and extending outside of the truck is a frame having longitudinal members 6, secured adjacent the side sills 1 and passing through apertures in the end sill 2. The longitudinal members, after passing through these apertures, have inwardly and downwardly extending portions 7 and a cross portion or cross member 8, connecting the ends thereof. The cross bar 8 is accordingly also depressed below the side sills 1, to accommodate the center sill of the car or other parts carried thereby. Cross bar 8 is provided with an offset portion 9, into which is bolted a suitable frame piece 10 by means of bolts 11. Frame piece 10, adjacent each end of the offset portion 9, is recessed as at 12, and in each recess there is provided a block 13, adapted to slide longitudinally in the recess toward and from the truck and the axle 4. Each block is held in adjusted position in its recess by means of screw bolts 14, passing through the frame 10 into the recesses 12 abutting against the blocks and provided with lock nuts 15. Blocks 13 are provided with line apertures or holes, into each of which is inserted one end of a pivot rod 16, so that the rod 16 is carried by the bar 8 in the offset portion 9 and extends parallel with the truck axles and is in alinement with the cross bar 8, on each side of the offset portion 9. 17 represents a dynamo provided with integral lugs 18, through which the rod 16 passes, so that the dynamo is pivotally supported by and suspended from the pivot rod 16 and cross bar 8. By arranging the pivot rod 16 in alinement with the cross bar 8, the strain on the bolts 11 is reduced to a minimum.

Carried by the cross bar 8 and bolted to the frame 10 by bolts 19, is an arm 20, extending outwardly and downwardly in front of the dynamo 17 and provided with an apertured lower end 21, through which extends a link 22, having its inner end pivotally connected to the dynamo at 23. A spring 24 is coiled about the outer end of link 22 and a hand nut 25 is adapted to compress the spring 24 against the lower end of arm 20, so as to tend to swing the dynamo away from the truck axle and maintain proper tension on the belt 26, which is adapted to drive the dynamo from the car axle 4, by passing over a pulley 27 on the dynamo and a pulley 28 on the car axle. It will be seen that either end of the pivot rod 16 may be adjusted toward and from the truck by adjustment of the holding screw bolts 14, so as to move the blocks 13 to bring either of the blocks 13 into the position desired. Likewise the whole frame extending outside of the truck may be adjusted, if desired, toward and from the truck by sliding bars 6 longitudinally through the apertures in the end of the truck and bolting bars 6 to the side sill into the desired adjusted position. Pulleys 27 and 28 may be brought into alinement by adjusting the pulley 28 along axle 4.

In the modifications shown in Figs. 5 and 6, the truck is shown at 30. Longitudinal bars 31 are secured to the side sills of the truck and then pass through apertures in the end of the truck, as shown in Figs. 1 and 2. On the outside of the truck the bars 31 are bent downwardly, as illustrated in Fig. 6. A cross bar 32 is connected to the downwardly extending ends of bars 31. By having its ends bent inwardly, as at 33, passing under the lower ends of the bars 31 and having the inner end abutting against the end of the truck, the ends 33 are secured to the ends of the bars 31 by means of two wrought iron splice plates 34, bolted together through the end of bar 31 by bolts 35 and through the end 33 of cross bar 34 by bolts 36. The cross bar 32 is provided with an offset portion 37, into which is inserted a U-shaped frame bar 38, bolted to the bar 32 by bolts 39 and 40. Frame bar 38 carries a pivot rod 39ª, extending through the sides of the U-shaped frame 38 and held therein by nuts 41 at its ends. The dynamo is illustrated at 42 and is provided with integral lugs 43, through which the pivot rod 39ª passes. Bolted to the offset portion 37, by screw bolt 44, is an outwardly, downwardly extending arm 45, having an apertured lower end 46, adapted to carry a tension device in a manner similar to that shown in Figs. 1, 2 and 3. It will be understood that the remaining parts of the apparatus are similar to those shown in Figs. 1, 2 and 3.

Referring to Figs. 7 and 8, the truck is there shown at 50, a cross bar at 51, provided with an offset portion 52, into which is secured a supporting frame 53 by means of bolts 54, the frame 53 being provided at each end with apertures for carrying the pivot rod 55, from which the dynamo 56 is pivotally suspended. Outwardly and downwardly extending bar 57 is bolted to the outer part of offset portion 52 and is provided with an apertured lower end 58 for carrying the tension bars. Secured adjacent the side sills of the truck and passing outwardly from the truck through apertures in the end thereof, are supporting bars 59, to which are secured steel splice plates 60, by means of bolts 61. Cross bar 51 is provided with inwardly bent ends 62, provided with slots through which pass bolts 63, carried by the splice plates 60. The bolts 61 are omitted from Fig. 7 for the sake of clearness. The inner splice plates 60 are provided with ears 64 carrying vertical pivot bolts 65, to which are pivotally secured links 66, extending outwardly from the cross bar 51 and screwed thereon on their outer ends and provided with nuts 67 thereon, on the outside of the bar 51, and nuts 68 thereon on the inside of the bar 51. By loosening the nuts 67 and 68, the cross bar 51 or either end thereof may be adjusted toward and from the truck by sliding the same inwardly and outwardly, relative to the bolts 63. This may be done by reason of the inwardly bent ends 62 of the bar 51 being slotted. When placed in the desired position, the bar 51 may be rigidly held therein by tightening the nuts 67 and 68 thereagainst, which will hold the bar 51 in rigid relation with the splice plates 60, the inner splice plates 60 being secured rigidly to the truck frame by means of bolts 69. In this arrangement all adjustment of the pivot rod 55, to aline it with the truck axle, is brought about by adjusting the nuts of the supporting cross bar 51, and the central portion of the suspending frame is made very secure and rigid.

Referring to Figs. 9 and 10, the truck is there illustrated at 70, carrying bars at 71, which may likewise be secured to the side sills of the truck and pass through openings in the end thereof and are bent downwardly outside of the truck, as clearly illustrated in Fig. 10. 72 represents a cross bar which is rigidly secured to the ends of the bar 71 by means of steel castings 73, bolts 74 securing the ends of bars 71 to castings 73 and bolts 75 securing the ends of cross bar 72 to the castings 73. Cross bar 72 is provided with an offset portion 76, and secured to the cross bar 72 by bolts 78 and adjacent one end of the offset portion 76 is a member 77, having a recess 79 carrying a block 80 slidable therein toward and from the truck and its axle and adjustably secured in any desired position therein, by means of screw bolts 81 and lock nuts 82. At the other end of the offset portion 76 there is secured to the bar 72 by means of bolts 83, a member 84, which is provided with a recess in which is rotatably mounted a block 85, held in any desired rotated position by means of screw bolts 86 and lock nuts 87. Each of the blocks 80 and 85 is provided with a hole or aperture into which is inserted one end of a pivot rod 88, extending through lugs 89 integral with the dynamo 90, so that the dynamo 90 is pivotally suspended from the pivot rod 88.

In each of the modifications shown in Figs. 5 to 10 inclusive, it will be seen that the cross bar is provided with supporting means carrying a pivot rod in alinement with the cross bar for pivotally supporting the dynamo.

In Fig. 11 is illustrated a further modification, in which the cross bar is shown at 95, and there is bolted thereto, by bolts 96, a double U-shaped member 97, having extending therethrough a pivot rod 98. The rod 98 extends through all four of the sides of the two U-shaped parts and is provided with cotters 99 to hold it in place. The dynamo is shown at 100 and is provided with integral lugs 101, one extending between the sides of one U-shaped part and the other extending between the sides of the other U-shaped part, the pivot rod 98 extending through the lugs 101, so that the dynamo is pivotally supported therefrom and is held against lateral movement by means of the sides of the U-shaped parts. Bolted to the cross bar 95 by some of the bolts 96 is an outwardly, downwardly extending arm 102, carrying a tension device similar to that shown in Figs. 1, 2 and 3. In Fig. 11 the dynamo is shown provided with pulley 104 and belt 105 for driving the same.

Although I have described my improvements in great detail and with respect to particular embodiments thereof, I do not desire to be limited to the details shown and described, since many other changes and modifications may well be made without departing from the spirit and scope of my invention in its broader aspects. I desire to cover all arrangements coming within the language of the appended claims.

What I claim as new and desire to secure by Letters Patent is:

1. A dynamo suspension having in combination with a car truck, a frame extending outside said truck having a cross bar with an offset portion, a pivot rod carried by the cross bar adjacent said offset portion, and a dynamo pivotally suspended from said pivot rod.

2. A dynamo suspension having in combination with a car truck, a frame extending outside said truck having a cross bar with an offset portion, a pivot rod carried by said cross bar and a dynamo pivotally supported by said pivot rod.

3. A dynamo suspension having in combination with a car truck, a frame extending outside said truck having a cross bar with an offset portion extending parallel with the truck axles, a pivot rod carried by said cross bar, and a dynamo pivotally suspended from said pivot rod.

4. A dynamo suspension having in combination with a car truck, a frame extending outside said truck having a cross bar with an offset portion, a pivot rod carried by said cross bar in said offset portion, and a dynamo pivotally supported by said cross bar.

5. A dynamo suspension having in combination with a car truck, a frame extending outside said truck having a cross bar with an offset portion extending parallel with the truck axles, a pivot rod carried by said cross bar in said offset portion, said rod also extending parallel with the truck axles, and a dynamo pivotally suspended from said cross bar.

6. A dynamo suspension having in combination with a car truck, a frame extending outside said truck having a cross bar with an offset portion, a pivot rod carried by said cross bar in said offset portion and in alinement with the cross bar, and a dynamo pivotally supported by said cross bar.

7. A dynamo suspension having in combination with a car truck, a frame extending outside said truck having a cross bar with an offset portion, a pivot rod carried by said cross bar, a dynamo pivotally supported by said pivot rod, and means whereby said rod may be adjusted to bring it parallel with the truck axles.

8. A dynamo suspension having in combination with a car truck, a frame extending outside said truck having a cross bar with an offset portion, a pivot rod carried by said cross bar in said offset portion and in alinement with the cross bar, a dynamo pivotally supported by said cross bar, and means whereby said rod may be adjusted to bring it parallel with the truck axles.

9. A dynamo suspension having in combination with a car truck, a frame extending outside said truck having a cross bar with an offset portion, supporting means carried by said cross bar adjacent the ends of the offset portion, a pivot rod carried by said supporting means, and a dynamo pivotally supported by said pivot rod.

10. A dynamo suspension having in combination with a car truck, a frame extending outside said truck having a cross bar with an offset portion, supporting means carried by said cross bar adjacent the ends of the offset portion, a pivot rod carried by said supporting means and in alinement with the cross bar on each side of the offset portion, and a dynamo pivotally supported by said cross bar.

11. A dynamo suspension having in combination with a car truck, a frame extending outside said truck having a cross bar with an offset portion, supporting means carried by said cross bar adjacent the ends of the offset portion, a pivot rod carried by said supporting means and in alinement with the cross bar on each side of the offset portion, a dynamo pivotally supported by said cross bar, and means whereby said rod may be adjusted to bring it parallel with the truck axles.

12. A dynamo suspension having in combination with a car truck, a frame extending outside said truck having a cross bar with an offset portion, supporting means carried by said cross bar adjacent the ends of the offset portion, a pivot rod carried by said supporting means, and means for adjusting one end of said pivot rod with respect to the cross bar toward and from the truck axles, and a dynamo pivotally supported by said pivot rod.

13. A dynamo suspension having in combination with a car truck, a frame extending outside said truck having a cross bar with an offset portion, supporting means carried by said cross bar adjacent the ends of the offset portion, a pivot rod carried by said supporting means and in alinement with the cross bar on each side of the offset portion, means for adjusting either end of said pivot rod toward and from the truck axles, and a dynamo pivotally supported by said pivot rod.

14. A dynamo suspension having in combination with a car truck, a frame extending outside said truck having a cross bar with an offset portion and adjustable toward and from the truck, a pivot rod carried by said cross bar, and a dynamo carried by said pivot rod.

15. A dynamo suspension having in combination with a car truck, a frame extending outside said truck having a cross bar, a pivot rod, a member bolted to one lateral side of said cross-bar and carrying said pivot rod, and a dynamo pivotally suspended from said cross bar.

16. A dynamo suspension having in combination with a car truck, a frame extending outside said truck having a cross bar, supporting means centrally carried by said cross bar, said means comprising a single integral bearing member, a pivot rod carried by said supporting means and having its bearings therein, and a dynamo pivotally suspended from said cross bar.

17. A dynamo suspension having in combination with a car truck, a frame extending outside said truck having a cross bar, supporting means centrally carried by said cross bar, said means comprising a single bearing member, a pivot rod carried by said bearing member, and having its bearings therein, a dynamo pivotally suspended from said cross bar, and means whereby said rod may be adjusted to bring it parallel with the truck axles.

18. A dynamo suspension having in combination with a car truck, a frame extending outside said truck having a cross bar, a bearing member secured to one lateral side of said cross bar, a pivot rod carried by said bearing member, a dynamo pivotally suspended from said cross bar, a belt driving the dynamo from an axle of the truck, an arm secured to and extending downwardly from said cross bar outside of the dynamo, and a tension device carried by said arm tending to swing the dynamo away from the truck axle to maintain tension on the belt.

19. A dynamo suspension having in combination with a car truck, a frame extending outside said truck having a cross bar with an offset portion, supporting means carried by said cross bar adjacent the ends of the offset portion, a pivot rod carried by said supporting means and in alinement with the cross bar on each side of the offset portion, a dynamo pivotally supported by said cross bar, a belt driving the dynamo from an axle of the truck, an arm secured to and extending downwardly from said cross bar outside of the dynamo, and a tension device carried by said arm tending to swing the dynamo away from the truck axle to maintain tension on the belt.

20. A dynamo suspension having in combination with a car truck, a frame extending outside said truck having a cross bar with an offset portion, supporting means carried by said cross bar adjacent the ends of the offset portion, a pivot rod carried by said supporting means, means for adjusting one end of said pivot rod with respect to the cross bar toward and from the truck axles, a dynamo pivotally supported by said pivot rod, a belt driving the dynamo from an axle of the truck, an arm secured to and extending downwardly from said cross bar outside of the dynamo, and a tension device carried by said arm tending to swing the dynamo away from the truck axle to maintain tension on the belt.

21. A dynamo suspension having in combination with a car truck, a frame extending outside said truck having a cross bar, supporting means centrally carried by said cross bar, a pivot rod carried by said supporting means, means for adjusting one end of said pivot rod in said supporting means toward and from the truck, and a dynamo pivotally supported by said pivot rod.

22. A dynamo suspension having in combination with a car truck, a frame extending outside the truck, said frame having longitudinal members secured adjacent the side sills of the truck, and a depressed cross bar portion connecting the ends of the longitudinal members, a pivot rod carried by said cross bar, and a dynamo pivotally suspended from said cross bar.

23. A dynamo suspension having in combination with a car truck, a frame extending outside the truck, said frame having longitudinal members secured adjacent the side sills of the truck, a depressed cross bar portion connecting the ends of the longitudinal members, said cross bar portion having an outwardly offset portion, a pivot rod carried therein in alinement with the cross bar on either side of the offset portion, and a dynamo pivotally supported by said pivot rod.

24. A dynamo suspension having in combination with a car truck, a frame extending outside the truck, said frame having longitudinal members, and an integral cross bar portion connecting the ends of the longitudinal members, a pivot rod carried by said cross bar, and a dynamo pivotally suspended from said pivot rod.

25. A dynamo suspension having in combination with a car truck, a frame extending outside the truck, said frame having longitudinal members secured adjacent the side sills of the truck, a depressed cross bar portion connecting the ends of the longitudinal members, said cross bar portion having an outwardly offset portion, a pivot rod carried therein in alinement with the cross bar on either side of the offset portion, a dynamo pivotally supported by said pivot rod, a belt driving the dynamo from an axle of the truck, an arm secured to and extending downwardly from said cross bar outside of the dynamo, and a tension device carried by said arm tending to swing the dynamo away from the truck axle to maintain tension on the belt.

In testimony whereof, I have signed my name to this specification.

WILLARD F. RICHARDS.

Copies of this patent may be obtained for five cents each, by addressing the "Commissioner of Patents, Washington, D. C."